United States Patent

Vaughan et al.

[11] Patent Number: 5,283,047
[45] Date of Patent: Feb. 1, 1994

[54] SYNTHESIS OF ECR-26 (C-2646)

[75] Inventors: David E. W. Vaughan, Flemington; Karl G. Strohmaier, Port Murray, both of N.J.

[73] Assignee: Exxon Research and Engineering Company, Florham Park, N.J.

[21] Appl. No.: 950,526

[22] Filed: Sep. 25, 1992

[51] Int. Cl.$^5$ ............................................. C01B 33/34
[52] U.S. Cl. .................................. 423/713; 423/718; 502/60; 208/46
[58] Field of Search ............... 423/700, 702, 713, 718; 502/64, 60, 73, 74; 208/46

[56] References Cited

U.S. PATENT DOCUMENTS 4,061,717 12/1977 Kerr et al. ........................ 423/702
4,211,760 7/1980 Grose et al. ........................ 423/713

OTHER PUBLICATIONS

Kokotailo et al., "Possible Structures Related to Gmelinite", Nature, No. 4945, Aug. 8, 1964, pp. 621-623.
Ribeiro et al. ed., Zeolites Science and Technology 1984, "Synthesis of Zeolites, An Overview", pp. 109-126 by Rollmann, L. D.
Meier et al., Atlas of Zeolite Structure Types, 3rd Ed., 1992, pp. 102-103.

Primary Examiner—R. Bruce Breneman
Attorney, Agent, or Firm—Ronald D. Hantman

[57] ABSTRACT

A transition metal substituted form of the mineral gmelinite.

5 Claims, 1 Drawing Sheet

X-ray diffraction spectra: ECR-26

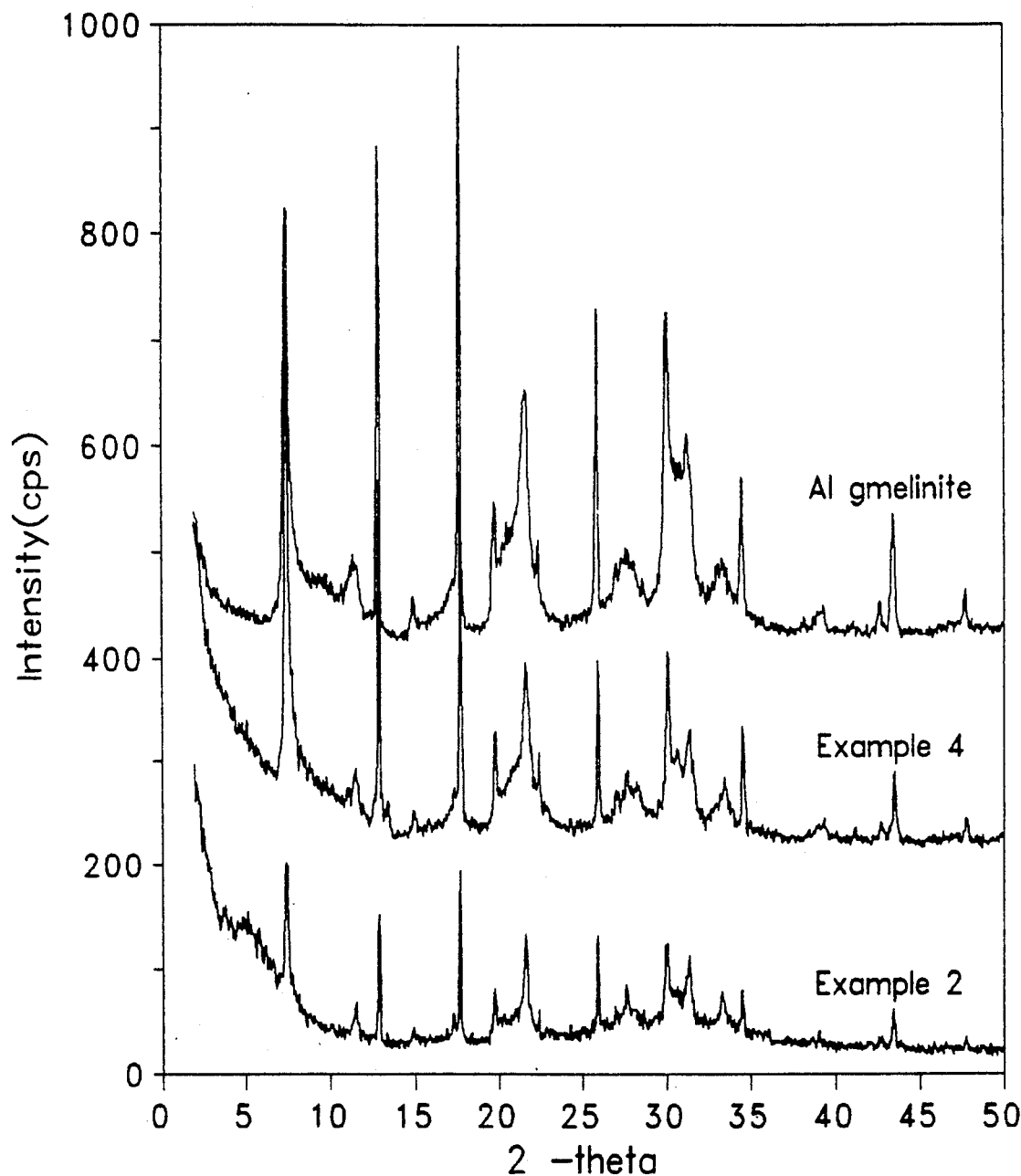
Figure
X-ray diffraction spectra: ECR-26

SYNTHESIS OF ECR-26 (C-2646)

BACKGROUND OF THE INVENTION

The present invention is a synthetic crystalline zeolite (hereinafter referred to as ECR-26) which is a transition metal substituted form of the mineral gmelinite.

Gmelinite is a well-known natural zeolite having a structure in which the main feature is a large 12-ring channel, and in this regard it is analogous to zeolites Linde L, mordenite, and cancrinite. All previously reported compositions contain only Si and Al in framework sites, and have a propensity to form intergrown materials comprising atomic level intergrowths of gmelinite and chabazite. All known natural varieties are thought to be of this type, resulting in a blocked 12-ring channel and poor sorption properties resulting from a variety of possible intergrowths (G. T. Kokotailo and S. L. Lawton, Nature, 203, p. 621, (1964)). The only known gmelinite materials having open 12-ring channels are made with a DABCO polymer filling the channels (L. D. Rollman, NATO ASI Ser. E-60, "Zeolites: Science and Technology", R. Ribeiro et al, p. 109, (1984)). ECR-26 is an open channel chromiumaluminosilicate gmelinite which requires no organic template for its synthesis. The $Cr^{3+}$ presumably inhibits the formation of phases which normally intergrow with gmelinite, facilitating the growth of the perfect open structure.

Materials of this general structure are important catalysts and sorbents, particularly in hydrocracking and hydroisomerization (mordenite) and aromatization and reforming (zeolite L). Similar important catalyst applications are anticipated for ECR-26, and because the transition metal may be manipulated into non-framework sites, important Fischer-Tropsch applications are possible.

SUMMARY OF THE INVENTION

The present invention is a synthetic crystalline zeolite having the formula $Na_2O:(Al, Fe, Cr)_2O_3:xSiO_2:YH_2O$ where x is between 4 and 8, the number of atoms of Al is greater than or equal to the number of atoms of Cr plus Fe, Y is between 0 and about 8 and the zeolite is characterized by the x-ray diffraction pattern of the figure, and a n-hexane sorption capacity generally greater than about 3 wt %. The presence of transition metal tends to eliminate intergrowths of chabazite or related structures which block the 12-ring channel of gmelinite. Such intergrowth free ECR-26 may be expected to have useful sorption and catalytic properties.

DESCRIPTION OF THE PREFERRED EMBODIMENT

The present invention is new synthetic chemical form of the gmelinite zeolite structure type (hereinafter referred to as ECR-26). This structure has been made in a form where the framework T atoms comprise Si, Al, Cr, and Fe. The general formula for this new composition is:

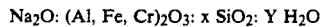

Na₂O: (Al, Fe, Cr)₂O₃: x SiO₂: Y H₂O where x is between 4 and 8, and Al>(Cr+Fe). Y is between about 0 and 8.

Conventional natural and synthetic gmelinite has a propensity to intergrow with chabazite or related zeolites which block the 12-ring channel of the gmelinite structure, reducing the expected sorption properties to those of an 8-ring or smaller window zeolite. The conventional non-transition metal forms have been reported by several authors and are found abundantly in nature (e.g., along the Bay of Fundy in Nova Scotia).

ECR-26 is characterized by an X-ray diffraction pattern having the following major lines:

| dÅ | I/Io |
|------|------|
| 11.9 | Vs |
| 6.8 | S |
| 5.0 | Vs |
| 4.49 | M |
| 4.11 | MS |
| 3.44 | MS |
| 2.97 | MS |
| 2.85 | M |
| 2.59 | M | where VS=very strong, 65-100%; S=strong, 70-85%; MS=medium strong, 25-65%; M=medium, 10-35%

The structure can be indexed on a hexagonal lattice having indices of a=13.7Å±0.4Å and C=10Å±0.4Å. Comparative spectra for a conventional Si/Al material and those of this invention are shown in the FIGURE.

DESCRIPTION OF THE FIGURE

The FIGURE is a comparison of the CuKα radiation x-ray diffraction patterns of a gmelinite made only with Si and Al (top) and with the same for the products of Examples 2 and 4.

EXAMPLE 1

A seed composition was made by dissolving 12.0 gm aluminum oxide trihydrate in a solution of 60.0 gm NaOH in 100 gm H₂O at 100° C. After complete dissolution of the alumina, the solution was cooled to room temperature and added, with vigorous mixing, to a solution containing 201.6 gm sodium silicate (P. Q. Corp. "N" brand) and 100 gm H₂O. The mixture was adjusted to a total weight of 500 gms by addition of H₂O, and then homogenized in a blender. The solution was allowed to age at room temperature for at least 16 hours prior to use as a nucleant slurry.

EXAMPLE 2

A gel composition of:

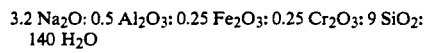

3.2 Na₂O: 0.5 Al₂O₃: 0.25 Fe₂O₃: 0.25 Cr₂O₃: 9 SiO₂: 140 H₂O was prepared by first making a sodium aluminate solution by dissolving 4.9 gm aluminum oxide trihydrate in a solution of 8.7 gm NaOH in 12 gm H₂O at 100° C. After complete dissolution of the alumina, the solution was cooled to room temperature. A transition metal solution was prepared by dissolving 9.4 gm FeCl₃·6H₂O and 9.26 gm CrCl₃·6H₂O in 30 gm H₂O. The following ingredients were added with mixing to a 600 ml beaker: 121.9 gm sodium silicate (8.9% Na₂O; 28.7% SiO₂), 22.6 gm seed solution from example 1, and sodium aluminate solution. The iron, chromium solution was then mixed in along with sufficient H₂O to bring the total weight of gel to 250 gm. The green gel was placed in a 500 ml teflon bottle, and reacted for 16 days at 100° C. in an air oven. The product was filtered, washed with distilled H₂O and dried in an 115° C. oven. X-ray diffraction analysis showed excellent ECR-26, whose pattern is shown in FIG. 1 and Table 1. Elemental analysis gave a composition of:

8.24% Na; 3.46% Al; 4.12% Fe; 3.64% Cr; 22.9% Si, which indicated a stoichiometry of:

1.32 Na$_2$O: (0.26 Cr, 0.27 Fe, 0.47 Al)$_2$O$_3$: 6.00 SiO$_2$.

Thermogravimetric analysis showed a total H$_2$O wt. loss of 18.9%. After drying at 400° C. for 18 hours this ECR-26 sample absorbed 4.3% n-hexane at 21° C. and 50 torr.

The X-ray diffraction pattern was indexed on a hexagonal lattice having unit cell dimensions a=13.74 and c=10.04Å.

EXAMPLE 3

A gel composition of:

3.2 Na$_2$O: 0.25 Cr$_2$O$_3$: 0.75 Al$_2$O$_3$: 9 SiO$_2$: 135 H$_2$O was prepared in a manner similar to example 2, but using the following ingredients:

| | | |
|---|---|---|
| NaOH | = | 6.85 gm |
| Al$_2$O$_3$.3H$_2$O | = | 8.77 gm |
| Sodium Silicate | = | 154.7 gm |
| Seed Solution (Ex. 1) | = | 28.6 gm |
| Al$_2$(SO$_4$)$_3$.17H$_2$O | = | 3.61 gm |
| Cr Cl$_3$.6H$_2$O | = | 11.8 gm |
| H$_2$O | = | 85.7 gm |
| Total weight | = | 300.00 gm |

The gel was thoroughly homogenized in a blender and transferred to a teflon-lined autoclave, where it was reacted at 150° C. for 16 hours. The product was filtered, washed with distilled H$_2$O and dried in 115° C. oven. X-ray diffraction analysis showed excellent ECR-26, whose pattern was indexed on a hexagonal lattice having unit cell dimensions of a=13.74 and c=10.03. Chemical analysis gave a composition of:

7.66% Na; 6.48% Al; 4.22% Cr; 23.4% Si indicating an ECR-26 stoichiometry of 1.04 Na$_2$O: (0.25 Cr, 0.75 Al)$_2$O$_3$: 5.19 SiO$_2$ Thermogravimetric analysis showed a total H$_2$O wt. loss of 21%. After ammonium exchange and calcination for 20 hours at 400° C. the sample absorbed 3.7 wt % n-hexane at room temperature and 50 torr.

EXAMPLE 4

A gel composition of:

4.0 Na$_2$O: 0.25 Cr$_2$O$_3$: 0.75 Al$_2$O$_3$: 12 SiO$_2$: 180 H$_2$O was prepared by first making a sodium aluminate solution by dissolving 26.5 gm aluminum oxide trihydrate in a solution of 88.8 gm NaOH in 120 gm H$_2$O at 100° C. After complete dissolution of the alumina, the solution was cooled to room temperature. To a 1.25 liter blender added 408.4 gm colloidal silica (40% SiO$_2$; duPont Ludox HS-40) and 200 gm H$_2$O. The following ingredients were then added with vigorous mixing: sodium aluminate solution, 30.2 gm CrCl$_3$.6H$_2$O dissolved in 60 gm H$_2$O, and enough H$_2$O to bring the total weight of the mixture to 1000 gm. The green gel was placed into two 500 ml Teflon bottles, cold aged at room temperature for two days, and then reacted in an air oven at 100° C. for 62 days. The product was filtered, washed with distilled H$_2$O and dried a 115° C. in an oven. X-ray diffraction analysis showed excellent ECR-26, whose pattern is shown in the FIGURE and Table 1. Elemental analysis gave a composition of:

8.43% Na; 6.3% Al; 4.2% Cr; 27.4% Si, which represents a stoichiometry of:

1.17 Na$_2$O: (0.26 Cr, 0.74 Al)$_2$O$_3$: 6.2 SiO$_2$.

A 2 gm portion of this product was slurred in 20 gm H$_2$O. The pH of this slurry was maintained at pH=4.0 by addition of 1N HCl for one hour at 50° C. The product was filtered washed with distilled H$_2$O and then dried at 115° C. in an oven. A portion of this acid treated product was equilibrated at 56% relative humidity and analyzed by thermogravimetric analysis which showed a total H$_2$O wt. loss of 18.6%. Another portion of the acid treated product absorbed 4.3% n-hexane after contact for 1 hour of 45 torr vapor at room temperature after drying in 400° C. for 1 hour.

EXAMPLES 5-8

A series of reaction gels were prepared in a manner similar to that of example 4 but having the following stoichiometries:

4.0 Na$_2$O: x Cr$_2$O$_3$: 1−x Al$_2$O$_3$: 12 SiO$_2$: 180 H$_2$O

| Example No. | x |
|---|---|
| 5 | .05 |
| 6 | .10 |
| 7 | .15 |
| 8 | .00 |

The gels were cold aged at room temperature and then reacted at 100° C. for 10 days. The products were filtered, washed with distilled H$_2$O and dried at 115° C. in an oven. X-ray diffraction analyses and elemental analyses are given in Table 1.

TABLE 1

| Ex. No. | X-Ray Analysis* | % Al | % Si | % Na | % Cr | Si / Al + Cr | Na / Al + Cr |
|---|---|---|---|---|---|---|---|
| 5 | ECR-26 | 8.90 | 26.6 | 6.93 | 0.79 | 2.75 | .87 |
| 6 | ECR-26 | 8.32 | 24.9 | 6.66 | 1.51 | 2.63 | .86 |
| 7 | ECR-26 | 7.55 | 24.4 | 7.03 | 2.51 | 2.65 | .93 |
| 8 | FAU + GIS(P) + minor GME | | | | | | |

*FAU = FAUJASITE;
GIS(P) = zeolite P;
GME = gmelinite

After drying portions of these samples at 400° C. for 1 hour they absorbed the following amounts of n-hexane at 45 torr and room temperature after 1 hour:

| Example No. | Wt % Absorbed |
|---|---|
| 5 | 3.0 |
| 6 | 3.3 |
| 7 | 2.8 |

TABLE 2

| | | | Al Gmelinite | | Example 2 | | Example 3 | |
|---|---|---|---|---|---|---|---|---|
| k | k | l | d(Å) | I/Io | d(Å) | I/Io | d(Å) | I/Io |
| 1 | 0 | 0 | 11.91 | 65 | 11.93 | 65 | 11.88 | 100 |
| 1 | 0 | 1 | 7.72 | 22 | 7.69 | 19 | 7.70 | 8 |
| 1 | 1 | 0 | 6.89 | 83 | 6.88 | 73 | 6.86 | 71 |
| 2 | 0 | 0 | 5.952 | 6 | 5.938 | 8 | | |
| 2 | 0 | 1 | 5.134 | 8 | 5.137 | 16 | | |
| 0 | 0 | 2 | 5.026 | 100 | 5.023 | 100 | 5.008 | 72 |
| 2 | 1 | 0 | 4.490 | 16 | 4.500 | 21 | 4.488 | 16 |
| 2 | 1 | 1 | 4.109 | 32 | 4.111 | 47 | 4.108 | 26 |
| 3 | 0 | 0 | 3.972 | 11 | 3.967 | 17 | 3.961 | 10 |
| 2 | 2 | 0 | 3.440 | 56 | 3.438 | 61 | 3.431 | 36 |
| 3 | 1 | 0 | | | 3.307 | 12 | | |
| 1 | 0 | 3 | | | 3.229 | 23 | 3.280 | 7 |
| 1 | 0 | 3 | | | | | 3.218 | 9 |
| 4 | 0 | 0 | 2.977 | 44 | 2.977 | 41 | 2.969 | 30 |
| 4 | 0 | 1 | 2.860 | 23 | 2.852 | 30 | 2.849 | 14 |
| 2 | 1 | 3 | 2.694 | 21 | 2.689 | 21 | 2.677 | 7 |
| 4 | 1 | 0 | 2.599 | 26 | 2.598 | 32 | 2.593 | 22 |
| 3 | 1 | 3 | 2.355 | 3 | | | | |
| 3 | 3 | 2 | 2.085 | 21 | 2.084 | 28 | 2.080 | 16 |

What is claimed is:

1. A synthetic transition metal aluminosilicate crystalline zeolite having the gmelinite structure and a chemical composition in the dehydrated form:

0.8 to 1.3 $M_{2/n}O$: (Al, Fe, Cr)$_2O_3$: 4 to 8 $SiO_2$ where n is the valence of metal M; the atoms of Al $\geq$ atoms of $$(Cr + Fe), \frac{Cr}{Cr + Al + Fe} \geq 0.05,$$

and characterized by an X-ray diffraction pattern having the following essential lines:

| dÅ | I/Io |
|---|---|
| 11.9 | VS |
| 6.8 | S |
| 5.0 | VS |
| 4.49 | M |
| 4.11 | MS |
| 3.44 | MS |
| 2.97 | MS |
| 2.85 | M |
| 2.59 | M. |

2. The zeolite of claim 1 wherein M is a metal selected from the group consisting of exchangeable cations of groups 1A through 8A and 1B and 2B of the Periodic Table.

3. A process for preparing the crystalline zeolite of claim 1 where M is Na and n is 1, which comprises:
   (a) preparing a reaction mixture comprising water, a source of silica, a source of alumina and NaOH, said reaction mixture having a composition, in terms of mole ratios of oxides, within the following ranges:

| | |
|---|---|
| $Na_2O$:$Al_2O_3$ | 1.0 to 6.0 |
| $SiO_2$:(Al,Cr,Fe)$_2O_3$ | 5 to 15 |
| $H_2O$:(Al,Cr,Fe)$_2O_3$ | 75 to 250 |

(b) maintaining the reaction mixture at between about 50° C. and 300° C. under autogenous pressure for a sufficient period of time to form crystals of the zeolite.

4. The process of claim 3 wherein the source of silica is sodium silicate or colloidal silica.

5. The process of claim 3 wherein the reaction mixture of step 3(b) is maintained at room temperature for a period greater than one day before reacting at 50° C.–300° C. under autogeneous pressure.

* * * * *